(12) United States Patent
Matsueda et al.

(10) Patent No.: US 9,855,550 B2
(45) Date of Patent: Jan. 2, 2018

(54) EXHAUST GAS-PURIFYING CATALYST

(71) Applicant: Cataler Corporation, Kakegawa-shi, Shizuoka (JP)

(72) Inventors: Satoshi Matsueda, Kakegawa (JP); Akimasa Hirai, Kakegawa (JP); Kenichi Taki, Kakegawa (JP); Sho Hoshino, Kakegawa (JP)

(73) Assignee: CATALER CORPORATION, Kakegawa-Shi, Shizuoka (JP)

( * ) Notice: Subject to any disclaimer, the term of this patent is extended or adjusted under 35 U.S.C. 154(b) by 0 days.

(21) Appl. No.: 15/410,889

(22) Filed: Jan. 20, 2017

(65) Prior Publication Data

US 2017/0209854 A1 Jul. 27, 2017

(30) Foreign Application Priority Data

Jan. 21, 2016 (JP) .................. 2016-009920

(51) Int. Cl.
*B01J 23/00* (2006.01)
*B01J 23/10* (2006.01)
(Continued)

(52) U.S. Cl.
CPC .......... *B01J 23/894* (2013.01); *B01D 53/945* (2013.01); *B01D 53/9454* (2013.01);
(Continued)

(58) Field of Classification Search
CPC . B01J 23/002; B01J 23/10; B01J 23/40; B01J 23/42; B01J 23/44; B01J 23/46;
(Continued)

(56) References Cited

U.S. PATENT DOCUMENTS 6,060,420 A * 5/2000 Munakata ............ B01D 53/945
502/302
6,129,862 A * 10/2000 Munakata ............ B01D 53/945
252/519.15
(Continued)

FOREIGN PATENT DOCUMENTS

JP 1-242199 9/1989
JP 6-75675 9/1994
(Continued)

OTHER PUBLICATIONS

German office action (including English language translation) dated Aug. 21, 2017 in connection with German Patent Application No. 10 2017 101 059.9.

*Primary Examiner* — Cam N. Nguyen
(74) *Attorney, Agent, or Firm* — John P. White; Cooper & Dunham LLP (57) ABSTRACT

An exhaust gas-purifying catalyst includes a support and a catalytic metal as one or more precious metals supported by the support. The support includes a composite oxide having a composition represented by a general formula $AB_\alpha C_\beta O_3$, wherein A represents one or more elements selected from the group consisting of lanthanum, neodymium, and yttrium, B represents iron or a combination of iron and aluminum, C represents one or more elements selected from the group consisting of iridium, ruthenium, tantalum, niobium, molybdenum, and tungsten, $\alpha$ and $\beta$ each represents a numerical value within a range of more than 0 and less than 1, and $\alpha$ and $\beta$ satisfy relational formulae of $\beta > \alpha$ and $\alpha + \beta \leq 1$.

4 Claims, 4 Drawing Sheets

(51) Int. Cl.
*B01J 23/40* (2006.01)
*B01J 23/42* (2006.01)
*B01J 23/44* (2006.01)
*B01J 23/46* (2006.01)
*B01J 23/745* (2006.01)
*B01J 23/83* (2006.01)
*B01J 23/84* (2006.01)
*B01J 23/847* (2006.01)
*B01J 23/881* (2006.01)
*B01J 23/887* (2006.01)
*B01J 23/888* (2006.01)
*B01J 23/89* (2006.01)
*B01D 53/94* (2006.01)
*F01N 3/28* (2006.01)

(52) U.S. Cl.
CPC ............ *B01J 23/002* (2013.01); *B01J 23/42* (2013.01); *B01J 23/44* (2013.01); *B01J 23/464* (2013.01); *B01J 23/8474* (2013.01); *B01J 23/8476* (2013.01); *B01J 23/888* (2013.01); *B01J 23/8871* (2013.01); *F01N 3/2807* (2013.01); *B01D 2255/102* (2013.01); *B01D 2255/1021* (2013.01); *B01D 2255/1023* (2013.01); *B01D 2255/1025* (2013.01); *B01D 2255/1026* (2013.01); *B01D 2255/1028* (2013.01); *B01D 2255/206* (2013.01); *B01D 2255/2061* (2013.01); *B01D 2255/2063* (2013.01); *B01D 2255/2068* (2013.01); *B01D 2255/2092* (2013.01); *B01D 2255/20738* (2013.01); *B01D 2255/20769* (2013.01); *B01D 2255/20776* (2013.01); *B01D 2255/402* (2013.01); *B01J 2523/00* (2013.01)

(58) Field of Classification Search
CPC . B01J 23/745; B01J 23/83; B01J 23/84; B01J 23/8474; B01J 23/8476; B01J 23/881; B01J 23/8871; B01J 23/8877; B01J 23/888; B01J 23/8885; B01J 23/8906; B01J 23/894; B01J 23/8993
See application file for complete search history.

(56) References Cited

U.S. PATENT DOCUMENTS

| | | | | |
|---|---|---|---|---|
| 6,800,388 | B2* | 10/2004 | Kaneko | B01J 23/002 429/479 |
| 7,205,257 | B2* | 4/2007 | Tanaka | B01D 53/945 502/302 |
| 7,576,032 | B2* | 8/2009 | Tanaka | B01D 53/945 502/302 |
| 7,601,325 | B2* | 10/2009 | Tanaka | B01D 53/945 423/263 |
| 7,795,170 | B2* | 9/2010 | Tanaka | B01J 23/002 502/304 |
| 8,007,691 | B2* | 8/2011 | Sawaki | C01G 49/0018 252/514 |
| 2005/0245391 | A1* | 11/2005 | Tanaka | B01D 53/945 502/302 |
| 2009/0131251 | A1* | 5/2009 | Matsueda | B01D 53/945 502/303 |
| 2009/0264283 | A1 | 10/2009 | Yang | |
| 2009/0286680 | A1* | 11/2009 | Hirano | B01J 37/0221 502/326 |
| 2011/0207601 | A1* | 8/2011 | Matsueda | B01D 53/945 502/303 |

FOREIGN PATENT DOCUMENTS

| | | |
|---|---|---|
| JP | 10-202101 | 8/1998 |
| JP | 2004-41866 | 2/2004 |
| JP | 2004-41867 | 2/2004 |
| JP | 2004-41868 | 2/2004 |

* cited by examiner

EXHAUST GAS-PURIFYING CATALYST

CROSS-REFERENCE TO RELATED APPLICATION

This application is based upon and claims the benefit of priority from Japanese Patent Applications No. 2016-009920, filed Jan. 21, 2016, the entire contents of which are incorporated herein by reference.

FIELD

The present invention relates to an exhaust gas-purifying catalyst.

BACKGROUND

Conventionally, as an exhaust gas-purifying catalyst that treats an exhaust gas of an automobile, a three-way catalyst with a precious metal such as platinum supported by an inorganic oxide such as ceria or alumina has been widely used. In the three-way catalyst, the precious metal plays the role in promoting the reduction of nitrogen oxides and the oxidations of carbon monoxide and hydrocarbons. The inorganic oxide plays the roles in increasing the specific surface area of the precious metal and suppressing the sintering of the precious metal by dissipating heat generated by the reactions.

In recent years, occasions when an automotive vehicle such as an automobile is driven at high-speed increase as the performance of an engine increases. Additionally, in order to prevent the pollution of the air, the regulations on the exhaust gas are made more stringent. Against these backdrops, temperature of the exhaust gas emitted by the automotive vehicle is on the trend of rising. For that, in order to achieve the exhaust gas-purifying catalyst that exhibits sufficient performance even when being used under such a condition, research and development are actively carried out.

For example, Jpn. Pat. Appln. KOKAI Publication No. 1-242149 describes $NiAl_2O_4$ generated during the reaction of alumina supporting a precious metal with nickel at high temperatures when nickel is used in order to remove hydrogen sulfide from an exhaust gas. The $NiAl_2O_4$ has a spinel structure. The Patent Literature describes large deterioration in the activity of a catalyst during the reaction. Furthermore, the Patent Literature describes the effective use of a composite oxide containing ceria and zirconia for the suppression of the reaction.

Jpn. Pat. Appln. KOKOKU Publication No. 6-75675 describes the grain growth of ceria when being used at high temperatures, which causes deterioration in oxygen storage capacity. The Patent Literature describes the grain growth of a composite oxide represented by a general formula $Ce_{1-x}La_xO_{2-x/2}$ when being used at high temperatures, which causes deterioration in purification performance. The composite oxide has a fluorite structure. Furthermore, in the Patent Literature, the following are described. Even when a composite oxide or a solid solution that contains zirconia and ceria, wherein the atomic ratio of zirconium and cerium is 5/95 to 70/30, is used at high temperatures, the grain growth of the composite oxide or the solid solution is less likely to occur.

Jpn. Pat. Appln. KOKAI Publication No. 10-202101 describes a support containing alumina, ceria, and zirconia uniformly dispersed and having high heat resistance.

Jpn. Pat. Appln. KOKAI Publication No. 2004-41866 describes a composite oxide having a perovskite structure represented by a general formula $ABPdO_3$. In the general formula, the element A is at least one rare-earth element such as La, Nd, and Y that exhibits a valence of 3 and cannot exhibit other valences. The element B is at least one element selected from the group consisting of Al and transition elements other than Co, Pd, and rare-earth elements. The Patent Literature describes the catalyst activity of palladium maintained at a high level for a long period of time when the composite oxide is used.

Jpn. Pat. Appln. KOKAI Publication No. 2004-41867 describes a composite oxide having a perovskite structure represented by a general formula $ABRhO_3$. In the general formula, the element A is at least one rare-earth element such as La, Nd, and Y that exhibits a valence of 3 and cannot exhibit other valences, or a combination of such a rare-earth element and at least one of Ce and Pr. The element B is at least one element selected from the group consisting of Al and transition elements other than Co, Rh, and rare-earth elements. The Patent Literature describes the catalyst activity of rhodium maintained at a high level for a long period of time when the composite oxide is used. Jpn. Pat. Appln. KOKAI Publication No. 2004-41868 describes a composite oxide having a perovskite structure represented by a general formula $A_{1-x}A'_xB_{1-y-z}B'_yPt_zO_3$. In the general formula, the element A is at least one rare-earth element such as La, Nd, and Y that exhibits a valence of 3, and cannot exhibit other valences. The element A' is at least one element selected from an alkaline-earth metal and Ag. The element B is at least one element selected from Fe, Mn, and Al. The element B' is at least one element selected from transition elements other than Pt, Fe, Mn, Co, and rare-earth elements. The Patent Literature describes the catalyst activity of platinum maintained at a high level for a long period of time when the composite oxide is used.

SUMMARY

An exhaust gas-purifying catalyst containing a precious metal such as palladium is apt to cause the sintering of the precious metal when a fuel-rich high temperature exhaust gas is supplied.

Thus, an object of the present invention is to provide an exhaust gas-purifying catalyst that is less prone to cause deterioration in performance due to the sintering of a precious metal.

According to an aspect of the present invention, there is provided an exhaust gas-purifying catalyst comprising a support including a composite oxide having a composition represented by a general formula $AB_\alpha C_\beta O_3$, wherein A represents one or more elements selected from the group consisting of lanthanum, neodymium, and yttrium, B represents iron or a combination of iron and aluminum, C represents one or more elements selected from the group consisting of iridium, ruthenium, tantalum, niobium, molybdenum, and tungsten, $\alpha$ and $\beta$ each represents a numerical value within a range of more than 0 and less than 1, and $\alpha$ and $\beta$ satisfy relational formulae of $\beta<\alpha$ and $\alpha+\beta\leq 1$; and a catalytic metal as one or more precious metals supported by the support. Examples of the composite oxide having the composition represented by the general formula include a composite oxide having oxygen vacancies.

DETAILED DESCRIPTION

Embodiments of the present invention will be described in detail below with reference to the drawings. In all the drawings, elements that are the same or similar in function are given the same reference characters, and their description will not be repeated.

Figure 1:
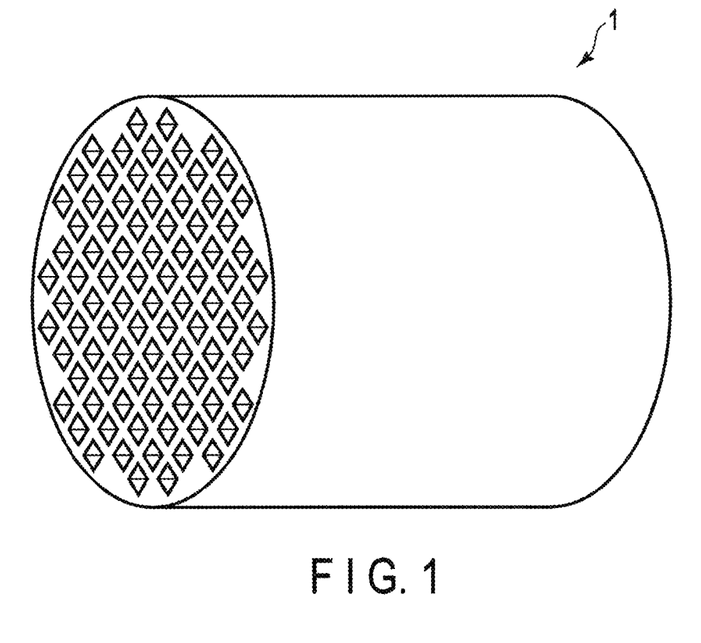
FIG. 1 is a perspective view schematically showing an exhaust gas-purifying catalyst according to an embodiment of the present invention.
Figure 2:
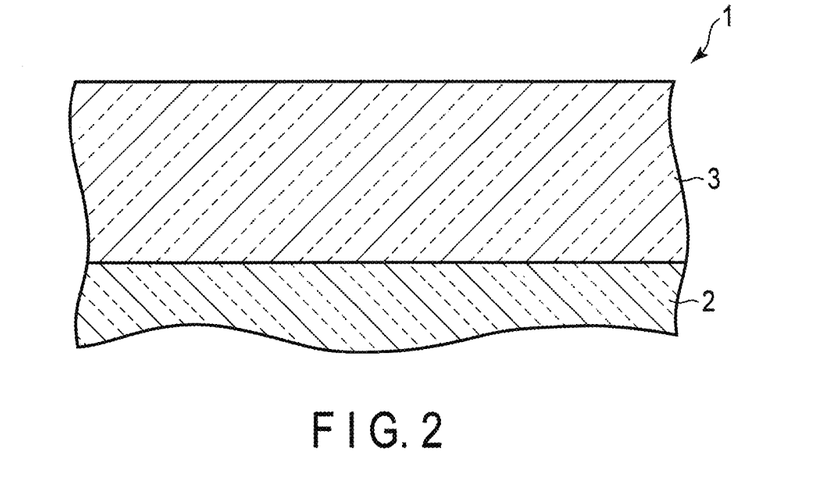
FIG. 2 is an enlarged cross-sectional view showing a part of the exhaust gas-purifying catalyst shown in FIG. 1.
Figure 3:
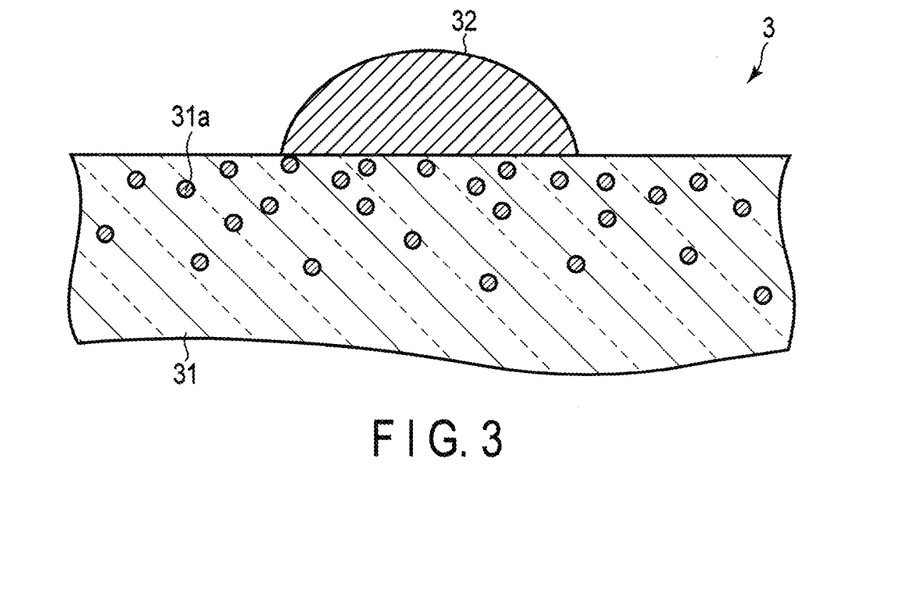
FIG. 3 is a cross-sectional view schematically showing a state of a catalyst layer of the exhaust gas-purifying catalyst shown in FIG. 1 in a fuel-lean high temperature atmosphere.
Figure 4:
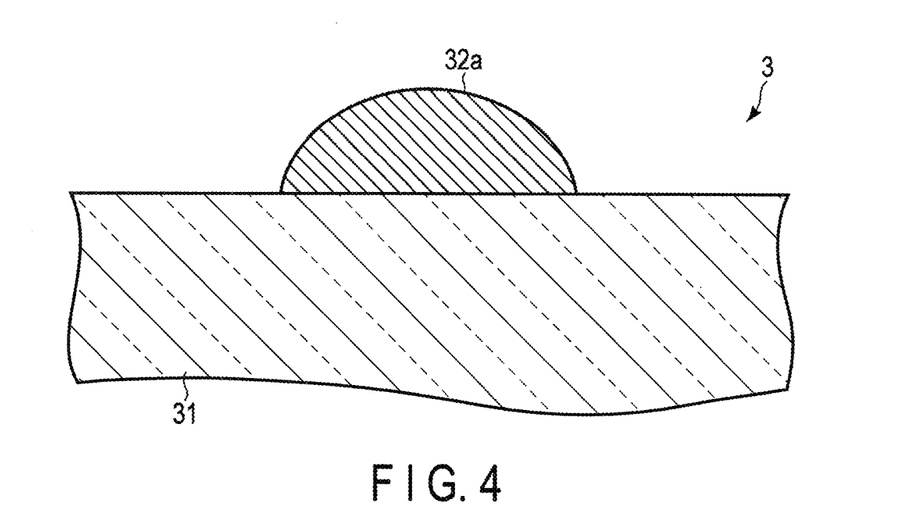
FIG. 4 is a cross-sectional view schematically showing a state of a catalyst layer of the exhaust gas-purifying catalyst shown in FIG. 1 in a fuel-rich high temperature atmosphere.

FIG. 1 is a perspective view schematically showing an exhaust gas-purifying catalyst according to an aspect of the present invention. FIG. 2 is an enlarged cross-sectional view showing a part of the exhaust gas-purifying catalyst shown in FIG. 1. FIG. 3 is a cross-sectional view schematically showing a state of a catalyst layer of the exhaust gas-purifying catalyst shown in FIG. 1 in a fuel-lean high temperature atmosphere. FIG. 4 is a cross-sectional view schematically showing a state of a catalyst layer of the exhaust gas-purifying catalyst shown in FIG. 1 in a fuel-rich high temperature atmosphere.

An exhaust gas-purifying catalyst 1 shown in FIGS. 1 and 2 is a monolith catalyst. The exhaust gas-purifying catalyst 1 contains a substrate 2 such as a monolith honeycomb substrate. Typically, the substrate 2 is made of ceramic such as cordierite.

A catalyst layer 3 is formed on a partition wall of the substrate 2. The catalyst layer 3 contains a support 31 and a catalytic metal 32 that are shown in FIGS. 3 and 4.

The support 31 exists in the form of particles, for example. In this case, the average particle diameter of the support 31 is, for example, within a range of 0.5 to 100 μm, and typically within a range of 1 to 20 μm. The "average particle diameter" means a value obtained by the following method.

First, a part of the catalyst layer 3 is removed from the exhaust gas-purifying catalyst 1. Next, using a scanning electron microscope (SEM), an SEM image of this sample is taken at a 2,500 to 50,000-fold magnification. Twenty-five SEM images are taken. Then, the four particles in full view are randomly selected from the supports 31 in the SEM images, and the area is obtained for each of the selected particles. Diameters of circles having the same areas as the above-described areas are calculated, and the arithmetic mean of the diameters is obtained. The arithmetic mean is stated as the average particle diameter. The standard deviation of the average particle diameter is 15 μm or less.

The support 31 plays the roles in increasing the specific surface area of the catalytic metal 32 and suppressing the sintering of the catalytic metal 32 by dissipating heat generated by the reactions. Another roles of the support 31 will be described in detail later.

The support 31 includes a composite oxide having a composition represented by the following general formula:

$AB_\alpha C_\beta O_3$

The composite oxide is a compound represented by a general formula $AB_\alpha C_\beta O_3$, for example. Alternatively, the composite oxide is a mixture containing a plurality of compounds each represented by a general formula $AB_\alpha C_\beta O_3$.

In the general formula, A is one or more elements selected from the group consisting of one or more rare earth elements whose valence does not deviate from trivalent, i.e., lanthanum, neodymium, and yttrium. Typically, the element A is lanthanum or a combination of lanthanum and neodymium or yttrium. In the latter case, the ratio of lanthanum in the element A is, for example, 60 atomic % or more, and typically 70 atomic % or more. Also, in this case, the ratio of lanthanum in the element A is, for example, 99 atomic % or less, and typically 95 atomic % or less.

The element B is iron or a combination of iron and aluminum. In the latter case, the ratio of iron in the element B is, for example, 50 atomic % or more, and typically 60 atomic % or more. Also, in this case, the ratio of iron in the element B is, for example, 99 atomic % or less, and typically 95 atomic % or less.

C represents one or more elements selected from the group consisting of iridium, ruthenium, tantalum, niobium, molybdenum, and tungsten. More typically, the element C is iridium or a combination of iridium and other element. In the latter case, the ratio of iridium in the element C is, for example, 35 atomic % or more, and typically 50 atomic % or more. Also, in this case, the ratio of iridium in the element C is, for example, 99 atomic % or less, and typically 95 atomic % or less.

α and β each represents a numerical value within a range of more than 0 and less than 1, and satisfy relational formulae of $\beta<\alpha$ and $\alpha+\beta\leq 1$. For example, α and β satisfy relational formulae of $\beta<\alpha$ and $0.901\leq\alpha+\beta\leq 1$.

β can be specified according to the following formula using α.

$$\beta = (1-\alpha) \times \frac{\text{solid solution-forming ratio (\%) of element } C}{100}$$

Here, the solid solution-forming ratio (%) of the element C means a value obtained as follows. First, an exhaust gas-purifying catalyst is heated to high temperatures in an oxidizing atmosphere, for example, heated at 1000° C. in an air atmosphere for 1 hour. A part of the heated exhaust gas-purifying catalyst is taken, and immersed for 12 hours in 25% hydrochloric acid at room temperature, which allows only the composite oxide to be dissolved in the hydrochloric acid. The hydrochloric acid in which the composite oxide is dissolved is filtered to produce a filtrate, and the filtrate is subjected to inductively coupled plasma (ICP) spectrometry to obtain the content of the element C in the filtrate. From the content of the element C in the filtrate, the proportion of the element C solid-solutioned in the composite oxide, i.e., the solid solution-forming ratio of the element C is obtained.

α is, for example, within a range of 0.7 to 0.9995, and β is, for example, within a range of 0.000475 to 0.201. α is typically within a range of 0.9 to 0.999, and β is typically within a range of 0.00094 to 0.083.

When the composite oxide is a compound having the composition represented by the general formula, α and β satisfy the above conditions. When the composite oxide is a mixture containing a plurality of compounds each represented by the general formula, α and β satisfy the above conditions, for example, in each of the compounds contained in the composite oxide. When β is increased, the effect of suppressing the sintering of the catalytic metal 32 is enhanced. It is, however, difficult to manufacture a composite oxide having increased β.

The compound represented by the general formula is a compound having a perovskite structure, for example.

The compound represented by the general formula may have oxygen vacancies. Similarly, examples of the composite oxide described herein include a compound having a smaller oxygen molar fraction in addition to the compounds represented by the general formula.

Since the compound represented by the general formula contains iron that can change its valence as the element B, the element C is likely to be solid-solutioned in a support 31 when an oxygen concentration in the atmosphere is high under a high temperature condition. When the oxygen concentration in the atmosphere is low under the high temperature condition, the element C precipitates out of the support 31 and forms an alloy with the catalytic metal 32 at high efficiency. The element C produces fine particles whenever it precipitates out of the support 31. The melting point of the catalytic metal 32 is increased when it is alloyed with the element C. Furthermore, when the oxygen concentration in the atmosphere is high under the high temperature condition, the element C is less prone to cause evaporation because the element C is solid-solutioned in the support 31. Therefore, the exhaust gas-purifying catalyst 1 is less likely to cause the sintering of the catalytic metal 32, which maintains the performance over a long period of time.

On the other hand, when the compound represented by the general formula $AB_\alpha C_\beta O_3$ contains an element causing no valence change as the element B, for example, in the case of a composite oxide $MgTi_{0.99}Ru_{0.0091}O_3$, the distortion of the crystal structure of the composite oxide is limited because the element B (titanium) causing no valence change. Thus, the solid-solution formation of the element C (ruthenium) with the support and the precipitation of the element C out of the support are less prone to occur. Therefore, such an exhaust gas-purifying catalyst is less likely to cause alloy formation between the element C (ruthenium) and the catalytic metal on the support, and thus the sintering of the catalytic metal on the support is prone to occur.

Typically, the support 31 shown in FIGS. 3 and 4 further contains the element C, for example, the same element C as that contained in the composite oxide in the form of an elemental metal that is not solid-solutioned in the composite oxide in addition to the above-mentioned composite oxide. The ratio of the element C in the form of the elemental metal to the total amount of the element C contained in the exhaust gas-purifying catalyst 1 is, for example, 80 atomic % or less, and typically 65 atomic % or less. The ratio is, for example, 1 atomic % or more, and typically 5 atomic % or more.

The ratio of the amount of the element C contained in the composite oxide to the total amount of the element C contained in the exhaust gas-purifying catalyst 1 is, for example, 7 atomic % or more, typically 20 atomic % or more, more typically 30 atomic % or more, and still more typically 35 atomic % or more. The ratio is, for example, 99 atomic % or less, and typically 95 atomic % or less.

The numerical values mentioned for the element C herein are values obtained for the exhaust gas-purifying catalyst 1 immediately after being heated to high temperatures in an oxidizing atmosphere.

The catalytic metal 32 contains one or more precious metals. The precious metals are rhodium, palladium, platinum, or a combination thereof. In the exhaust gas-purifying catalyst 1 immediately after being heated to high temperatures in an oxidizing atmosphere, the precious metals exist as element metals for example. At this time, at least a part of the precious metals may be oxidized (the oxidation number is increased). In the exhaust gas-purifying catalyst 1 immediately after being heated to high temperatures in a reducing atmosphere, at least a part of the precious metals exist in the form of an alloy together with the element C.

The ratio of the mass of the precious metals contained in the catalytic metal 32 to the total of the mass of the support 31 and the mass of the catalytic metal 32 is, for example, within a range of 0.01 to 10% by mass, and typically within a range of 0.1 to 5% by mass. When the mass ratio is decreased, the support 31 is required in a greater amount in order to achieve high exhaust gas purification performance, which causes an increase in the thermal capacity of the exhaust gas-purifying catalyst 1. The increased mass ratio is apt to cause the sintering of the catalytic metal 32.

The ratio of the mass of the catalytic metal 32 to the volume of the exhaust gas-purifying catalyst 1 is, for example, within a range of 0.1 to 20 g/L, and typically within a range of 1 to 10 g/L. The decreased ratio makes it difficult to achieve high exhaust gas-purification performance. The increased ratio causes an increase in cost of raw materials for the exhaust gas-purifying catalyst 1.

The numerical value mentioned for the catalytic metal 32 herein is a value obtained for the exhaust gas-purifying catalyst 1 immediately after being heated to high temperatures in an oxidizing atmosphere.

The catalyst layer 3 can further contain other components. For example, the catalyst layer 3 may further contain an oxygen storage material.

The oxygen storage material stores oxygen under an oxygen-rich condition and emits oxygen under an oxygen-lean condition so as to optimize the oxidation reactions of HC and CO and the reductive reactions of $NO_x$. The oxygen storage material is in the form of particles, for example.

The oxygen storage material is, for example, ceria, a composite oxide of ceria with another metal oxide, or a mixture thereof. As the composite oxide, for example, a composite oxide of ceria and zirconia can be used.

The exhaust gas-purifying catalyst 1 provides a state change to be described later under high temperature conditions.

FIG. 3 shows a state of the catalyst layer 3 of the exhaust gas-purifying catalyst 1 when being exposed to an atmosphere with a high oxygen concentration under high temperature conditions, for example, when the fuel supply to an engine is cut off. On the other hand, FIG. 4 shows a state of the catalyst layer 3 of the exhaust gas-purifying catalyst 1 when being exposed to an atmosphere with a low oxygen concentration under high temperature conditions, for example, when an abundance of fuel is continuously supplied to an engine, for example. Herein, the precious metal contained in the catalytic metal 32 is stated as palladium, and the element C is stated as iridium in order to simplify the description thereof. In FIG. 3, reference character 31a represents iridium solid-solutioned in the support 31. In FIG. 4, reference character 32a represents an alloy containing palladium and iridium.

In the state shown in FIG. 3, palladium contained in the catalytic metal 32 exists as a simple metal, for example. In this state, at least a part of palladium may be oxidized.

When the oxygen concentration of the atmosphere under high temperature conditions is decreased, the catalyst layer 3 of the exhaust gas-purifying catalyst 1 changes from the state shown in FIG. 3 to the state shown in FIG. 4. Specifically, iridium is precipitated from the support 31, and at least a part of the precipitated iridium and palladium form an alloy.

When the oxygen concentration of the atmosphere under high temperature conditions is increased again, the catalyst layer 3 of the exhaust gas-purifying catalyst 1 changes from the state shown in FIG. 4 to the state shown in FIG. 3. Specifically, at least a part of iridium forming an alloy together with palladium is solid-solutioned in the support 31, and palladium changes to a simple metal or its oxide from the alloy. At least a part of iridium existing as a simple metal is also solid-solutioned in the support 31.

Thus, the catalyst layer 3 of the exhaust gas-purifying catalyst 1 reversibly changes with a change in the oxygen concentration of the atmosphere under high temperature conditions.

The melting point of the alloy containing iridium and palladium is higher than the melting point of palladium. Therefore, when the atmosphere is at high temperatures and the oxygen concentration thereof is low, the sintering of palladium is less likely to occur.

When the atmosphere is at high temperatures and the oxygen concentration thereof is high, iridium may volatilize as iridium oxide. However, when the oxygen concentration of the atmosphere under high temperature conditions is increased, iridium is solid-solutioned in the support 31. The composite oxide containing iridium is less likely to volatilize as compared with iridium oxide. Therefore, the exhaust gas-purifying catalyst 1 is less likely to cause the volatilization of iridium.

As apparent from the above description, the sintering of the precious metals contained in the catalytic metal 32 can be suppressed for a long period of time by adopting the above-mentioned configuration. That is, the exhaust gas-purifying catalyst 1 is less likely to cause deterioration in performance resulting from the sintering of the precious metals.

The exhaust gas-purifying catalyst 1 is manufactured by the following method, for example.

First, a support 31 is prepared. The support 31 is prepared by the following method, for example. That is, coprecipitation is produced in an aqueous solution containing a salt of an element A and a salt of an element B. Then, the aqueous solution is stirred, for example, at a temperature of 50 to 80° C. for 60 to 180 minutes, and an aqueous solution containing a salt of an element C is then added to the stirred aqueous solution to further produce coprecipitation in the mixed solution. Then, the coprecipitate thus obtained is dried, and fired in an oxidizing atmosphere. A firing temperature is set to be within a range of 500 to 1000° C., for example. As above, the support 31 is obtained.

Next, the support 31 is dispersed in deionized water to produce a dispersion liquid. Subsequently, a solution containing a salt of at least one precious metal of rhodium, palladium, and platinum is added to the dispersion liquid, to cause the support 31 to adsorb the precious metal. Then, this is dried, and fired in an oxidizing atmosphere. A firing temperature is set to be within a range of about 250 to about 500° C., for example. As above, a supported catalyst containing the support 31 and a catalytic metal 32 supported by the support 31 is obtained.

Then, a slurry containing the supported catalyst is prepared. Another component, for example, an oxygen storage material is added to the slurry if necessary. Then, the slurry is coated on the substrate 2 to produce a coated film, and the coated film is dried and fired. As above, an exhaust gas-purifying catalyst 1 is completed.

In the exhaust gas-purifying catalyst 1 described herein, the catalyst layer 3 has a single layer structure, but the catalyst layer 3 may have a multilayer structure. The monolith catalyst has been described herein, but the above-mentioned technique can also be applied to a pellet catalyst.

EXAMPLES

Hereinafter, examples of the present invention will be described.

<Manufacture of Catalyst C1>

An exhaust gas-purifying catalyst was manufactured by the following method.

First, a lanthanum nitrate aqueous solution containing 0.1 mol of lanthanum and an iron nitrate aqueous solution containing 0.099 mol of iron were added to 500 mL of deionized water to produce a mixed solution, and the mixed solution was stirred. Then, an aqueous solution containing potassium hydroxide at the concentration of 20% by mass was added to the mixed solution until the pH of the mixed solution reached 10 at room temperature so as to cause coprecipitation.

The aqueous solution was stirred at 70° C. for 150 minutes, and an iridium nitrate aqueous solution containing 0.001 mol of iridium was then added to the stirred aqueous solution to produce a mixed aqueous solution. Then, an aqueous solution containing potassium hydroxide at the concentration of 20% by mass was added to the mixed aqueous solution until the pH of the mixed aqueous solution reached 12 at room temperature so as to cause coprecipitation.

Then, the solution was filtrated to produce a filter cake, and the filter cake was washed with pure water. Subsequently, this was dried at 110° C., and fired in the atmosphere at 1000° C. for 1 hour. As above, a powdery support was obtained.

A part of the powder was taken, and immersed for 12 hours in 25% hydrochloric acid held at room temperature. Note that this condition allowed only the composite oxide of the above powder to be dissolved. Subsequently, the solution was filtrated to a produce a filtrate, and the filtrate was subjected to inductively coupled plasma (ICP) spectrometry. As a result, the iridium content of the filtrate revealed that 94% of iridium formed the solid solution, that is, the solid solution-forming ratio was 94%.

The crystal structure of the powder was investigated according to X-ray diffraction. As a result, the powder was confirmed to have a perovskite structure.

Next, the powdery support obtained by the above-mentioned method was added to 500 mL of deionized water. After the support was well dispersed in the deionized water by 10 minutes of ultrasonic agitation, a palladium nitrate aqueous solution was added to the slurry. The concentration and amount of the palladium nitrate aqueous solution were adjusted such that a palladium ratio in a supported catalyst to be prepared was 0.5% by mass.

Then, the slurry was filtrated under suction to produce a filtrate. The filtrate was subjected to ICP spectrometry. As a result, it was revealed that the filter cake contained almost the entire palladium in the slurry.

Next, the filter cake was dried at 110° C. for 12 hours. Subsequently, this was fired in the atmosphere at 500° C. for 1 hour. Thus, the palladium was supported by the support.

The supported catalyst was then compression-molded to produce a molded product, and the molded product was pulverized into pellets having a particle diameter of 0.5 mm to 1.0 mm. As above, a pellet catalyst was obtained as an exhaust gas-purifying catalyst. Hereinafter, the pellet catalyst is referred to as a "catalyst C1".

<Manufacture of Catalyst C2>

A pellet catalyst was manufactured by the same method as that described above for the catalyst C1 except that firing for obtaining a support was performed at 950° C. instead of 1000° C. Hereinafter, the pellet catalyst is referred to as a "catalyst C2".

In the manufacture of the catalyst C2, the solid solution-forming ratio of iridium was measured by the same method as that performed in the manufacture of the catalyst C1. As a result, the solid solution-forming ratio was 82%.

<Manufacture of Catalyst C3>

A pellet catalyst was manufactured by the same method as that described above for the catalyst C1 except that firing for obtaining a support was performed at 900° C. instead of 1000° C. Hereinafter, the pellet catalyst is referred to as a "catalyst C3".

In the manufacture of the catalyst C3, the solid solution-forming ratio of iridium was measured by the same method as that performed in the manufacture of the catalyst C1. As a result, the solid solution-forming ratio was 64%.

<Manufacture of Catalyst C4>

A pellet catalyst was manufactured by the same method as that described above for the catalyst C1 except that firing for obtaining a support was performed at 800° C. instead of 1000° C. Hereinafter, the pellet catalyst is referred to as a "catalyst C4".

In the manufacture of the catalyst C4, the solid solution-forming ratio of iridium was measured by the same method as that performed in the manufacture of the catalyst C1. As a result, the solid solution-forming ratio was 48%.

<Manufacture of Catalyst C5>

A pellet catalyst was manufactured by the same method as that described above for the catalyst C1 except that firing for obtaining a support was performed at 700° C. instead of 1000° C. Hereinafter, the pellet catalyst is referred to as a "catalyst C5".

In the manufacture of the catalyst C5, the solid solution-forming ratio of iridium was measured by the same method as that performed in the manufacture of the catalyst C1. As a result, the solid solution-forming ratio was 33%.

<Manufacture of Catalyst C6>

A pellet catalyst was manufactured by the same method as that described above for the catalyst C1 except that firing for obtaining a support was performed at 600° C. instead of 1000° C. Hereinafter, the pellet catalyst is referred to as a "catalyst C6".

In the manufacture of the catalyst C6, the solid solution-forming ratio of iridium was measured by the same method as that performed in the manufacture of the catalyst C1. As a result, the solid solution-forming ratio was 20%.

<Manufacture of Catalyst C7>

A pellet catalyst was manufactured by the same method as that described above for the catalyst C1 except that firing for obtaining a support was performed at 500° C. instead of 1000° C. Hereinafter, the pellet catalyst is referred to as a "catalyst C7".

In the manufacture of the catalyst C7, the solid solution-forming ratio of iridium was measured by the same method as that performed in the manufacture of the catalyst C1. As a result, the solid solution-forming ratio was 9%.

<Manufacture of Catalyst C8>

An exhaust gas-purifying catalyst was manufactured by the following method.

First, a lanthanum nitrate aqueous solution containing 0.1 mol of lanthanum and an iron nitrate aqueous solution containing 0.1 mol of iron were added to 500 mL of deionized water to produce a mixed solution, and the mixed solution was stirred. Then, an aqueous solution containing potassium hydroxide at the concentration of 20% by mass was added to the mixed solution until the pH of the mixed solution reached 10 at room temperature so as to cause coprecipitation.

Then, the solution was filtrated to produce a filter cake, and the filter cake was washed with pure water. Subsequently, this was dried at 110° C., and fired in the atmosphere at 1000° C. for 1 hour. As above, a powdery support was obtained.

Next, the powdery support obtained by the above-mentioned method was added to 500 mL of deionized water. After the support was well dispersed in the deionized water by 10 minutes of ultrasonic agitation, a palladium nitrate aqueous solution was added to the slurry. The concentration and amount of the palladium nitrate aqueous solution were adjusted such that a palladium ratio in a supported catalyst to be prepared was 0.5% by mass.

Then, the slurry was filtrated under suction to produce a filtrate. The filtrate was subjected to ICP spectrometry. As a result, it was revealed that the filter cake contained almost the entire palladium in the slurry.

Next, the filter cake was dried at 110° C. for 12 hours. Subsequently, this was fired in the atmosphere at 500° C. for 1 hour. Thus, the palladium was supported by the support.

The supported catalyst was then compression-molded to produce a molded product, and the molded product was pulverized into pellets having a particle diameter of 0.5 mm to 1.0 mm. As above, a pellet catalyst was obtained as an exhaust gas-purifying catalyst. Hereinafter, the pellet catalyst is referred to as a "catalyst C8".

<Manufacture of Catalyst C9>

A pellet catalyst was manufactured by the same method as that described above for the catalyst C1 except that an iron nitrate aqueous solution containing 0.09995 mol of iron and an iridium nitrate aqueous solution containing 0.00005 mol of iridium were respectively used instead of an iron nitrate aqueous solution containing 0.099 mol of iron and an iridium nitrate aqueous solution containing 0.001 mol of iridium. Hereinafter, the pellet catalyst is referred to as a "catalyst C9".

Also in the manufacture of the catalyst C9, the solid solution-forming ratio of iridium was measured by the same method as that performed in the manufacture of the catalyst C1. As a result, the solid solution-forming ratio was 95%.

<Manufacture of Catalyst C10>

A pellet catalyst was manufactured by the same method as that described above for the catalyst C1 except that an iron nitrate aqueous solution containing 0.0999 mol of iron and an iridium nitrate aqueous solution containing 0.0001 mol of iridium were respectively used instead of an iron nitrate aqueous solution containing 0.099 mol of iron and an iridium nitrate aqueous solution containing 0.001 mol of iridium. Hereinafter, the pellet catalyst is referred to as a "catalyst C10".

In the manufacture of the catalyst C10, the solid solution-forming ratio of iridium was measured by the same method as that performed in the manufacture of the catalyst C1. As a result, the solid solution-forming ratio was 94%.

<Manufacture of Catalyst C11>

A pellet catalyst was manufactured by the same method as that described above for the catalyst C1 except that an iron nitrate aqueous solution containing 0.09 mol of iron and an iridium nitrate aqueous solution containing 0.01 mol of iridium were respectively used instead of an iron nitrate aqueous solution containing 0.099 mol of iron and an iridium nitrate aqueous solution containing 0.001 mol of iridium. Hereinafter, the pellet catalyst is referred to as a "catalyst C11".

In the manufacture of the catalyst C11, the solid solution-forming ratio of iridium was measured by the same method as that performed in the manufacture of the catalyst C1. As a result, the solid solution-forming ratio was 83%.

<Manufacture of Catalyst C12>

A pellet catalyst was manufactured by the same method as that described above for the catalyst C1 except that an iron nitrate aqueous solution containing 0.07 mol of iron and an iridium nitrate aqueous solution containing 0.03 mol of iridium were respectively used instead of an iron nitrate aqueous solution containing 0.099 mol of iron and an iridium nitrate aqueous solution containing 0.001 mol of iridium. Hereinafter, the pellet catalyst is referred to as a "catalyst C12".

Also in the manufacture of the catalyst C12, the solid solution-forming ratio of iridium was measured by the same method as that performed in the manufacture of the catalyst C1. As a result, the solid solution-forming ratio was 67%.

<Manufacture of Catalyst C13>

A pellet catalyst was manufactured by the same method as that described above for the catalyst C1 except that a mixed solution of a lanthanum nitrate aqueous solution containing 0.09 mol of lanthanum and a neodymium nitrate aqueous solution containing 0.01 mol of neodymium was used instead of a lanthanum nitrate aqueous solution containing 0.1 mol of lanthanum. Hereinafter, the pellet catalyst is referred to as a "catalyst C13".

Also in the manufacture of the catalyst C13, the solid solution-forming ratio of iridium was measured by the same method as that performed in the manufacture of the catalyst C1. As a result, the solid solution-forming ratio was 91%.

<Manufacture of Catalyst C14>

A pellet catalyst was manufactured by the same method as that described above for the catalyst C1 except that a mixed solution of a lanthanum nitrate aqueous solution containing 0.095 mol of lanthanum and an yttrium nitrate aqueous solution containing 0.005 mol of yttrium was used instead of a lanthanum nitrate aqueous solution containing 0.1 mol of lanthanum. Hereinafter, the pellet catalyst is referred to as a "catalyst C14".

In the manufacture of the catalyst C14, the solid solution-forming ratio of iridium was measured by the same method as that performed in the manufacture of the catalyst C1. As a result, the solid solution-forming ratio was 93%.

<Manufacture of Catalyst C15>

A pellet catalyst was manufactured by the same method as that described above for the catalyst C1 except that a mixed solution of an iron nitrate aqueous solution containing 0.089 mol of iron and an aluminum nitrate aqueous solution containing 0.01 mol of aluminum was used instead of an iron nitrate aqueous solution containing 0.099 mol of iron. Hereinafter, the pellet catalyst is referred to as a "catalyst C15".

In the manufacture of the catalyst C15, the solid solution-forming ratio of iridium was measured by the same method as that performed in the manufacture of the catalyst C1. As a result, the solid solution-forming ratio was 90%.

<Manufacture of Catalyst C16>

A pellet catalyst was manufactured by the same method as that described above for the catalyst C1 except that a ruthenium acetate aqueous solution containing 0.001 mol of ruthenium was used instead of an iridium nitrate aqueous solution containing 0.001 mol of iridium. Hereinafter, the pellet catalyst is referred to as a "catalyst C16".

In the manufacture of the catalyst C16, the solid solution-forming ratio of ruthenium was measured by the same method as that in the measurement of the solid solution-forming ratio of iridium performed in the manufacture of the catalyst C1. As a result, the solid solution-forming ratio was 91%.

<Manufacture of Catalyst C17>

A pellet catalyst was manufactured by the same method as that described above for the catalyst C1 except that a tantalum-n-butoxide aqueous solution containing 0.001 mol of tantalum was used instead of an iridium nitrate aqueous solution containing 0.001 mol of iridium. Hereinafter, the pellet catalyst is referred to as a "catalyst C17".

In the manufacture of the catalyst C17, the solid solution-forming ratio of tantalum was measured by the same method as that in the measurement of the solid solution-forming ratio of iridium performed in the manufacture of the catalyst C1. As a result, the solid solution-forming ratio was 79%.

<Manufacture of Catalyst C18>

A pellet catalyst was manufactured by the same method as that described above for the catalyst C1 except that a pentaethoxy niobium aqueous solution containing 0.001 mol of niobium was used instead of an iridium nitrate aqueous solution containing 0.001 mol of iridium. Hereinafter, the pellet-catalyst is referred to as a "catalyst C18".

In the manufacture of the catalyst C18, the solid solution-forming ratio of niobium was measured by the same method as that in the measurement of the solid solution-forming ratio of iridium performed in the manufacture of the catalyst C1. As a result, the solid solution-forming ratio was 62%.

<Manufacture of Catalyst C19>

A pellet catalyst was manufactured by the same method as that described above for the catalyst C1 except that a hexaammonium heptamolybdate aqueous solution containing 0.001 mol of molybdenum was used instead of an iridium nitrate aqueous solution containing 0.001 mol of iridium. Hereinafter, the pellet catalyst is referred to as a "catalyst C19".

In the manufacture of the catalyst C19, the solid solution-forming ratio of molybdenum was measured by the same method as that in the measurement of the solid solution-forming ratio of iridium performed in the manufacture of the catalyst C1. As a result, the solid solution-forming ratio was 55%.

<Manufacture of Catalyst C20>

A pellet catalyst was manufactured by the same method as that described above for the catalyst C1 except that an ammonium tungstate aqueous solution containing 0.001 mol of tungsten was used instead of an iridium nitrate aqueous solution containing 0.001 mol of iridium. Hereinafter, the pellet catalyst is referred to as a "catalyst C20".

In the manufacture of the catalyst C20, the solid solution-forming ratio of tungsten was measured by the same method as that in the measurement of the solid solution-forming ratio of iridium performed in the manufacture of the catalyst C1. As a result, the solid solution-forming ratio was 46%.

<Manufacture of Catalyst C21>

A pellet catalyst was manufactured by the same method as that described above for the catalyst C1 except that a dinitrodiamine platinum nitrate aqueous solution containing 0.001 mol of platinum was used instead of an iridium nitrate aqueous solution containing 0.001 mol of iridium. Hereinafter, the pellet catalyst is referred to as a "catalyst C21".

In the manufacture of the catalyst C21, the solid solution-forming ratio of platinum was measured by the same method as that in the measurement of the solid solution-forming ratio of iridium performed in the manufacture of the catalyst C1. As a result, the solid solution-forming ratio was 16%.

<Manufacture of Catalyst C22>

A pellet catalyst was manufactured by the same method as that described above for the catalyst C1 except that a dinitrodiamine platinum nitrate aqueous solution was used instead of a palladium nitrate aqueous solution. Hereinafter, the pellet catalyst is referred to as a "catalyst C22".

In the manufacture of the catalyst C22, the solid solution-forming ratio of iridium was measured by the same method as that performed in the manufacture of the catalyst C1. As a result, the solid solution-forming ratio was 92%.

<Manufacture of Catalyst C23>

A pellet catalyst was manufactured by the same method as that described above for the catalyst C1 except that a rhodium nitrate aqueous solution was used instead of a palladium nitrate aqueous solution. Hereinafter, the pellet catalyst is referred to as a "catalyst C23".

In the manufacture of the catalyst C23, the solid solution-forming ratio of iridium was measured by the same method as that performed in the manufacture of the catalyst C1. As a result, the solid solution-forming ratio was 94%.

<Manufacture of Catalyst C24>

An exhaust gas-purifying catalyst was manufactured by the following method.

First, commercially available γ-alumina powder was added to 500 mL of deionized water. The specific surface area of the alumina powder used herein was 150 m$^2$/g. After the alumina powder was well dispersed in the deionized water by 10 minutes of ultrasonic agitation, a palladium nitrate aqueous solution was added to the slurry. The concentration and amount of the palladium nitrate aqueous solution were adjusted such that a palladium ratio in a supported catalyst to be prepared was 0.5% by mass.

Then, the slurry was filtrated under suction to produce a filtrate. The filtrate was subjected to ICP spectrometry. As a result, it was revealed that the filter cake contained almost the entire palladium in the slurry.

Next, the filter cake was dried at 110° C. for 12 hours. Subsequently, this was fired in the atmosphere at 500° C. for 1 hour. Thus, the palladium was supported by the alumina support.

The supported catalyst was then compression-molded to produce a molded product, and the molded product was pulverized into pellets having a particle diameter of 0.5 mm to 1.0 mm. As above, a pellet catalyst was obtained as an exhaust gas-purifying catalyst. Hereinafter, the pellet catalyst is referred to as a "catalyst C24".

<Manufacture of Catalyst C25>

A pellet catalyst was manufactured by the same method as that described above for the catalyst C24 except that a dinitrodiamine platinum nitrate aqueous solution was used instead of a palladium nitrate aqueous solution. Hereinafter, the pellet catalyst is referred to as a "catalyst C25".

<Manufacture of Catalyst C26>

A pellet catalyst was manufactured by the same method as that described above for the catalyst C24 except that a rhodium nitrate aqueous solution was used instead of a palladium nitrate aqueous solution. Hereinafter, the pellet catalyst is referred to as a "catalyst C26".

<Manufacture of Catalyst C27>

A pellet catalyst was manufactured by the same method as that described above for the catalyst C1 except that stirring at 70° C. for 150 minutes was omitted in the preparation of a support. Hereinafter, the pellet catalyst is referred to as a "catalyst C27".

In the manufacture of the catalyst C27, the solid solution-forming ratio of iridium was measured by the same method as that performed in the manufacture of the catalyst C1. As a result, the solid solution-forming ratio was 7%.

<Manufacture of Catalyst C28>

A pellet catalyst was manufactured by the same method as that described above for the catalyst C1 except that a neodymium nitrate aqueous solution containing 0.1 mol of neodymium was used instead of a lanthanum nitrate aqueous solution containing 0.1 mol of lanthanum. Hereinafter, the pellet catalyst is referred to as a "catalyst C28".

In the manufacture of the catalyst C28, the solid solution-forming ratio of iridium was measured by the same method as that performed in the manufacture of the catalyst C1. As a result, the solid solution-forming ratio was 82%.

<Evaluation>

The endurance of the catalysts C1 to C28 was tested by the following method.

First, each of the catalysts C1 to C28 was set in a flow-type endurance test apparatus, and a gas containing nitrogen as a main component was made to flow through a catalyst bed at the flow rate of 500 mL/minute for 30 hours. During this period, the temperature of the catalyst bed was held at 1000° C. As the gas made to flow through the catalyst bed, a lean gas and a rich gas were used, and these gases were switched at intervals of 5 minutes.

Note that the lean gas was a gas prepared by adding oxygen to nitrogen at the concentration of 3%, while the rich gas was a gas prepared by adding carbon monoxide to nitrogen at the concentration of 6%.

Then, each of the catalysts C1 to C28 was set in an atmospheric fixed bed flow reactor. Then, the temperature of the catalyst bed was raised from 100° C. to 500° C. at the temperature increase rate of 12° C./minute and the exhaust gas-purifying ratio was continuously measured while a model gas was made to flow through the catalyst bed. As the model gas, a gas containing equivalent amounts of oxidizing components (oxygen and nitrogen oxides) and reducing components (carbon monoxide, hydrocarbons, and hydrogen), which were adjusted stoichiometrically, was used. The results are shown in the following Tables 1 to 3.

TABLE 1

| | Catalytic metal | | Support | | 50% purification temperature (° C.) | |
|---|---|---|---|---|---|---|
| Catalyst | Element | Amount (mass %) | Final product composition | Crystal structure | Solid solution-forming ratio (%) | HC | NOx |
| C1 | Pd | 0.5 | LaFe$_{0.99}$Ir$_{0.0094}$O$_3$ | Perovskite | 94 | 367 | 365 |
| C2 | Pd | 0.5 | LaFe$_{0.99}$Ir$_{0.0082}$O$_3$ | Perovskite | 82 | 371 | 368 |
| C3 | Pd | 0.5 | LaFe$_{0.99}$Ir$_{0.0064}$O$_3$ | Perovskite | 64 | 377 | 373 |
| C4 | Pd | 0.5 | LaFe$_{0.99}$Ir$_{0.0048}$O$_3$ | Perovskite | 48 | 384 | 380 |

TABLE 1-continued

| Catalyst | Catalytic metal Element | Amount (mass %) | Final product composition | Support Crystal structure | Solid solution-forming ratio (%) | 50% purification temperature (° C.) HC | NOx |
|---|---|---|---|---|---|---|---|
| C5 | Pd | 0.5 | $LaFe_{0.99}Ir_{0.0033}O_3$ | Perovskite | 33 | 392 | 388 |
| C6 | Pd | 0.5 | $LaFe_{0.99}Ir_{0.002}O_3$ | Perovskite | 20 | 425 | 419 |
| C7 | Pd | 0.5 | $LaFe_{0.99}Ir_{0.0009}O_3$ | Perovskite | 9 | 454 | 448 |
| C8 | Pd | 0.5 | $LaFeO_3$ | Perovskite | — | 464 | 461 |
| C9 | Pd | 0.5 | $LaFe_{0.9995}Ir_{0.000475}O_3$ | Perovskite | 95 | 421 | 416 |
| C10 | Pd | 0.5 | $LaFe_{0.999}Ir_{0.00094}O_3$ | Perovskite | 94 | 380 | 377 |

TABLE 2

| Catalyst | Catalytic metal Element | Amount (mass %) | Final product composition | Support Crystal structure | Solid solution-forming ratio (%) | 50% purification temperature (° C.) HC | NOx |
|---|---|---|---|---|---|---|---|
| C11 | Pd | 0.5 | $LaFe_{0.9}Ir_{0.083}O_3$ | Perovskite | 83 | 376 | 373 |
| C12 | Pd | 0.5 | $LaFe_{0.7}Ir_{0.201}O_3$ | Perovskite | 67 | 415 | 411 |
| C13 | Pd | 0.5 | $La_{0.9}Nd_{0.1}Fe_{0.99}Ir_{0.0091}O_3$ | Perovskite | 91 | 362 | 361 |
| C14 | Pd | 0.5 | $La_{0.95}Y_{0.05}Fe_{0.99}Ir_{0.0093}O_3$ | Perovskite | 93 | 364 | 363 |
| C15 | Pd | 0.5 | $LaFe_{0.89}Al_{0.1}Ir_{0.009}O_3$ | Perovskite | 90 | 362 | 360 |
| C16 | Pd | 0.5 | $LaFe_{0.99}Ru_{0.0091}O_3$ | Perovskite | 91 | 371 | 366 |
| C17 | Pd | 0.5 | $LaFe_{0.99}Ta_{0.0079}O_3$ | Perovskite | 79 | 384 | 380 |
| C18 | Pd | 0.5 | $LaFe_{0.99}Nb_{0.0062}O_3$ | Perovskite | 62 | 391 | 385 |
| C19 | Pd | 0.5 | $LaFe_{0.99}Mo_{0.0055}O_3$ | Perovskite | 55 | 400 | 397 |
| C20 | Pd | 0.5 | $LaFe_{0.99}W_{0.0046}O_3$ | Perovskite | 46 | 417 | 413 |

TABLE 3

| Catalyst | Catalytic metal Element | Amount (mass %) | Final product composition | Support Crystal structure | Solid solution-forming ratio (%) | 50% purification temperature (° C.) HC | NOx |
|---|---|---|---|---|---|---|---|
| C21 | Pd | 0.5 | $LaFe_{0.99}Pt_{0.0016}O_3$ | Perovskite | 16 | 445 | 439 |
| C22 | Pt | 0.5 | $LaFe_{0.99}Ir_{0.0092}O_3$ | Perovskite | 92 | 380 | 398 |
| C23 | Rh | 0.5 | $LaFe_{0.99}Ir_{0.0094}O_3$ | Perovskite | 94 | 321 | 310 |
| C24 | Pd | 0.5 | $Al_2O_3$ | γ-alumina | — | 471 | 467 |
| C25 | Pt | 0.5 | $Al_2O_3$ | γ-alumina | — | 480 | 495 |
| C26 | Rh | 0.5 | $Al_2O_3$ | γ-alumina | — | 433 | 426 |
| C27 | Pd | 0.5 | $LaFe_{0.99}Ir_{0.0007}O_3$ | Perovskite | 7 | 457 | 450 |
| C28 | Pd | 0.5 | $NdFe_{0.99}Ir_{0.0082}O_3$ | Perovskite | 82 | 373 | 369 |

In Tables 1 to 3, the "final product composition" of the "support" is a composition obtained from the atomic ratios of elements specified by elemental analysis, and a crystal structure specified using X-ray diffraction. Herein, oxygen vacancies are disregarded. Regarding the atomic ratios of the elements other than elements that can be solid-solutioned in a support such as Ir, since the values of added amounts (charged amount) in the manufacture can be presumed to be equal to actual values, the values of the charged amounts were presumed as the actual values of the final product.

In Tables 1 to 3, the column denoted by "50% purification temperature" shows the lowest temperature of the catalyst bed at which 50% or more of each component contained in the model gas was purified. The columns denoted by "HC" and "$NO_x$" show the data for hydrocarbons and nitrogen oxides, respectively.

Figure 5:
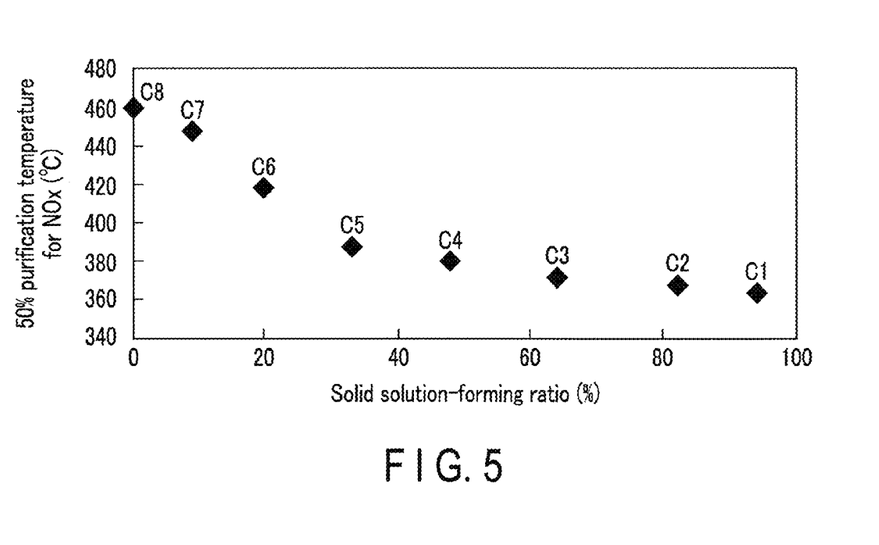
FIG. 5 is a graph showing an example of influence that the composition of a support exerts on the performance of the exhaust gas-purifying catalyst.

FIG. 5 is a graph showing an example of influence that the composition of the support exerts on the performance of the exhaust gas-purifying catalyst. The data obtained for the catalysts C1 to C8 are shown in FIG. 5. In FIG. 5, the abscissa represents the solid solution-forming ratio of iridium, and the ordinate represents the 50% purification temperature for $NO_x$.

Figure 6:
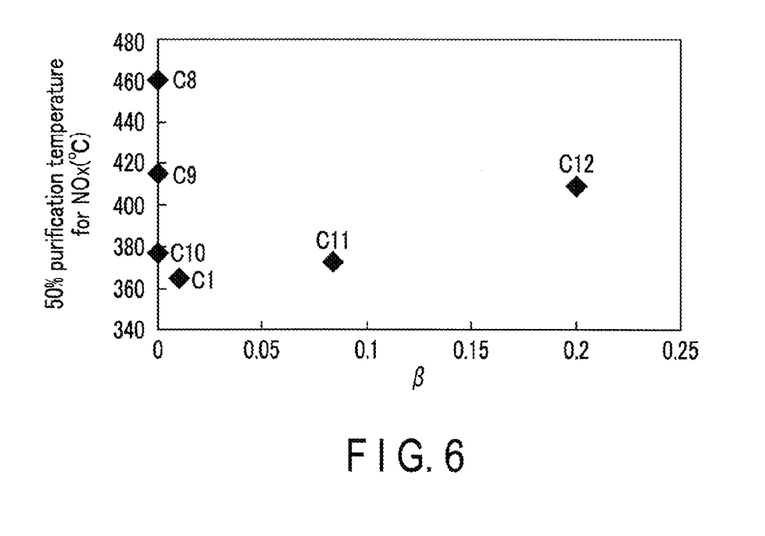
FIG. 6 is a graph showing another example of influence that the composition of a support exerts on the performance of the exhaust gas-purifying catalyst.

FIG. 6 is a graph showing another example of influence that the composition of the support exerts on the performance of the exhaust gas-purifying catalyst. The data obtained for the catalysts C1 and C8 to C12 are shown in FIG. 6. In FIG. 6, the abscissa represents β in the general formula, and the ordinate represents the 50% purification temperature for $NO_x$.

As shown in Tables 1 to 3 and FIG. 5, in the case where the composite oxide contained in the support had a perovskite structure, and at least a part of iridium was solid-solutioned in the support, higher exhaust gas-purification performance could be achieved as compared with the case where the composite oxide contained in the support did not have a perovskite structure or the case where iridium was not solid-solutioned in the support at all. In the case where the solid solution-forming ratio of iridium was 20% or more, particularly excellent exhaust gas-purification performance could be achieved. In the case where the solid solution-forming ratio of iridium was 30% or more, further excellent exhaust gas-purification performance could be achieved.

As shown in Tables 1 to 3 and FIG. 6, in the case where β was more than 0, higher exhaust gas-purification performance could be achieved as compared with the case where β was 0. In the case where β was within a range of 0.000475 to 0.201, particularly excellent exhaust gas-purification performance could be achieved.

In the case where β was in a range of 0.00094 to 0.083, the most excellent exhaust gas-purification performance could be achieved.

The method of manufacturing the catalyst C27 is different from the method for manufacturing the catalyst C1 only in that stirring at 70° C. for 150 minutes is omitted in the preparation of the support. However, the catalyst C27 has a remarkably lower solid solution-forming ratio of iridium than that of the catalyst C1. This shows that a heat treatment performed immediately after a first coprecipitation process exerts large influence on the solid solution-forming ratio of iridium.

When the data obtained for the catalysts C1 and C16 to C20 are compared, the catalysts C1 and C16 achieve more excellent performance than those of the catalysts C17 to C20. One of the reasons is considered to be that iridium and ruthenium achieve a higher solid solution-forming ratio than those of tantalum, niobium, molybdenum, and tungsten, and are thus less prone to cause evaporation. Another reason is considered to be that iridium and ruthenium are likely to form an alloy together with rhodium, palladium, and platinum as compared with tantalum, niobium, molybdenum, and tungsten, and have a large effect of suppressing the sintering of the alloys.

The catalyst C21 could not exhibit catalyst performance that is comparable to those of the catalysts C1 and C16 to C20. This result shows that platinum is not suitable as an element solid-solutioned in a support such as iridium.

<Analysis>

Each of the catalysts C1 and C24 was set in a flow-type endurance test apparatus, and a gas containing nitrogen as a main component was made to flow through a catalyst bed at the flow rate of 500 mL/minute for 30 hours. During this period, the temperature of the catalyst bed was held at 1000° C. As the gas made to flow through the catalyst bed, a lean gas and a rich gas were used, and these gases were switched at intervals of 5 minutes.

Note that the lean gas was a gas prepared by adding oxygen to nitrogen at the concentration of 3%, while the rich gas was a gas prepared by adding carbon monoxide to nitrogen at the concentration of 6%. The endurance test was performed such that the rich gas was finally made to flow through the catalyst bed.

After the endurance test, the catalyst layer of each of the catalysts C1 and C24 was observed by FE-SEM (field emission-scanning electron microscope).

Figure 7:
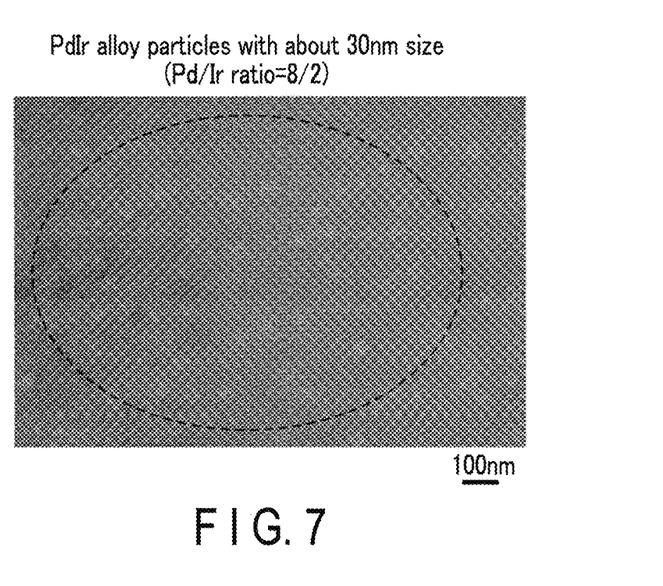
FIG. 7 is an electron microscope photograph of a catalyst layer obtained for a catalyst C1 after an endurance test.
Figure 8:
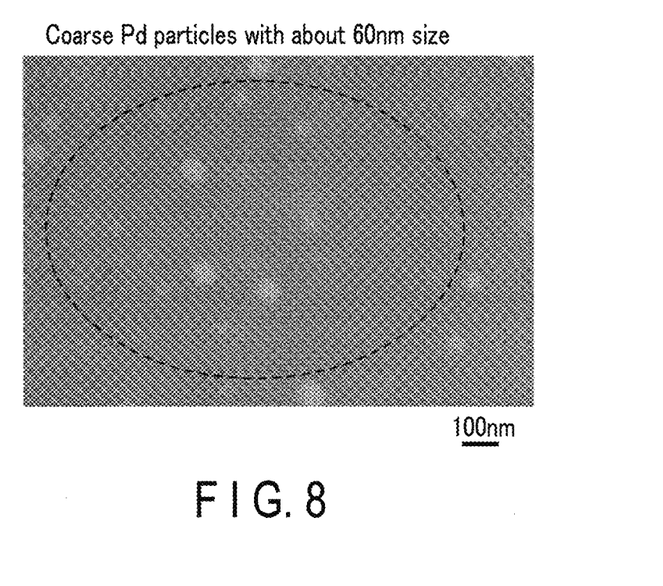
FIG. 8 is an electron microscope photograph of a catalyst layer obtained for a catalyst C24 after an endurance test.

FIG. 7 is an electron microscope photograph of the catalyst layer obtained for the catalyst C1 after the endurance test. FIG. 8 is an electron microscope photograph of the catalyst layer obtained for the catalyst C24 after the endurance test.

As shown in FIG. 8, in the catalyst layer of the catalyst C24, the average particle diameter of palladium was about 60 nm. In contrast, in the catalyst layer of the catalyst C1, as shown in FIG. 7, the average particle diameter of palladium was about 30 nm.

The catalyst layer of the catalyst C1 was subjected to EDX (field emission-scanning electron microscope-energy dispersive X-ray) analysis. As a result, the catalytic metal was confirmed to be made of an alloy containing palladium and iridium at the atomic ratio of 8:2.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and, spirit of the inventions.

What is claimed is:

1. An exhaust gas-purifying catalyst comprising:
a support including a composite oxide having a composition represented by a general formula $AB_\alpha C_\beta O_3$, wherein A represents one or more elements selected from the group consisting of lanthanum, neodymium, and yttrium, B represents iron or a combination of iron and aluminum, C represents one or more elements selected from the group consisting of iridium, ruthenium, tantalum, niobium, molybdenum, and tungsten, α and β each represents a numerical value within a range of more than 0 and less than 1, and α and β satisfy relational formulae of β<α and α+β≤1; and
a catalytic metal as one or more precious metals supported by the support,
wherein α is within a range of 0.7 to 0.9995, and β is within a range of 0.000475 to 0.201.

2. The exhaust gas-purifying catalyst according to claim 1, wherein a proportion of an amount of the element C contained in the composite oxide in a total amount of the element C contained in the exhaust gas-purifying catalyst is 20 atomic % or more.

3. The exhaust gas-purifying catalyst according to claim 1, wherein the composite oxide contains a compound having a perovskite structure.

4. The exhaust gas-purifying catalyst according to claim 1, wherein the catalytic metal contains palladium.

* * * * *